United States Patent [19]  
Miki et al.

[11] Patent Number: 4,578,698  
[45] Date of Patent: Mar. 25, 1986

[54] MULTIPLE DISPLAY CONTROL APPARATUS FOR A TELEVISION RECEIVER

[75] Inventors: Yutaka Miki, Hirakata; Toshiro Nozoe, Yamatokoriyama; Kiyoshi Uchimura, Uji, all of Japan

[73] Assignee: Matsushita Electric Industrial Co., Ltd., Kadoma, Japan

[21] Appl. No.: 504,783

[22] Filed: Jun. 16, 1983

[30] Foreign Application Priority Data

Jun. 18, 1982 [JP] Japan .............................. 57-105905  
Jun. 18, 1982 [JP] Japan .............................. 57-105907  
Jun. 18, 1982 [JP] Japan .............................. 57-105908

[51] Int. Cl.$^4$ ........................................... H04N 5/268  
[52] U.S. Cl. ..................................... 358/22; 358/183  
[58] Field of Search ................................ 358/22, 183

[56] References Cited  
U.S. PATENT DOCUMENTS

4,451,840 5/1984 Shanley, II ........................... 358/22  
4,464,676 8/1984 Russell et al. ........................ 358/22

Primary Examiner—Michael A. Masinick  
Attorney, Agent, or Firm—Wenderoth, Lind & Ponack

[57] ABSTRACT

A multiple display control apparatus for a television receiver used for displaying a plurality of signals on a display tube. In a case of switching a first signal output and a second signal output of a signal process circuit are switched by switching circuits, when the two output signals are about equal in the brightness level to each other, the picture is very indistinct. Thus, the first signal level is lowered by means of gain control circuits, the characteristic thereof depending on an output impedance of the signal process circuit and resistances. The control signals for switching and gain control are superposed each other as one signal, so that only one line is used for control signal.

8 Claims, 18 Drawing Figures

MULTIPLE DISPLAY CONTROL APPARATUS FOR A TELEVISION RECEIVER

BACKGROUND OF THE INVENTION

1. Field of the Invention

This invention relates to a multiple display control apparatus for a television receiver, which switches a plurality of television signals used therein and displays them on a display tube.

2. Description of the Prior Art

Figure 1:
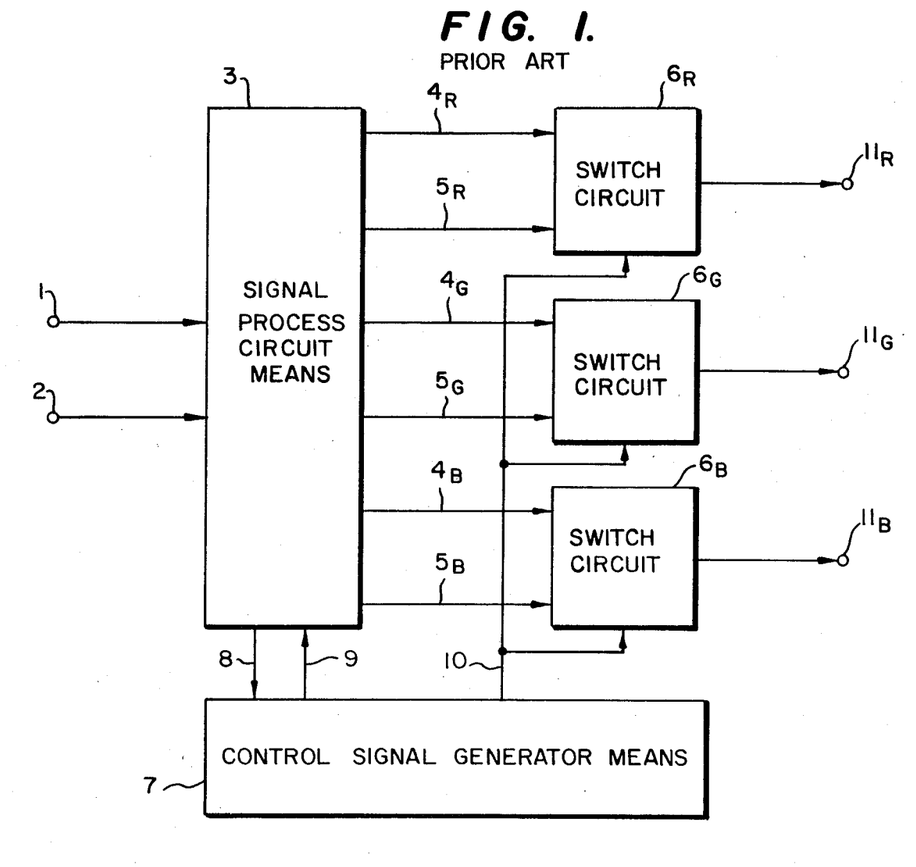
FIG. 1 is a block diagram of a conventional example.

The television receiver, in some cases, switches a plurality of signals to be displayed on a display tube, which will be described herein as to two kinds of signals for better understanding as follows:

Referring to FIG. 1, a block diagram of the conventional example is shown, in which the output of a video-chroma circuit in the television receiver is assumed to be of three primary colors of R (red), G (green) and B (blue).

Referring to FIG. 1, reference numeral 1 designates a first television signal input terminal, 2 designates a second television signal input terminal, 3 designates a signal process circuit, 4R designates a first R-signal output, 5R designates a second R-signal output, 6R designates a R-signal switching circuit, 4G designates a first G-signal output, 5G designates a second G-signal output, 6G designates a G-signal switching circuit, 4B designates a first B-signal output, 5B designates a second signal output, 6B designates a B-signal switching circuit, 7 designates a control signal generator means, 8 designates a television signal output, 9 designates a first control signal output, 10 designates a switch signal output, 11R designates a R-output terminal, 11G designates a G-signal output terminal, and 11B designates a B-signal output terminal. The R-signal switching circuit 6R, G-signal switching circuit 6G and B-signal switching circuit 6B, are quite the same in function so that the R-signal, G-signal and B-signal are not distinguished from each other in use. In a case where the signal process circuit 3 functions not for the three primary colors of red, green and blue, but for the color difference signal (R-Y, G-Y, B-Y) and luminance signal (Y), further one system of switching circuit need only be added, which is the same as the three primary colors red, green and blue.

In FIG. 1, a video signal is given to the first television signal input terminal 1 and processed at the signal process circuit 3 to thereby obtain the three primary colors of red, green and blue in the first signal output 4. The second television signal input terminal 2 is given other video signals or a video signal the same as that given to the first television signal input terminal 1, the other video signals being processed by the signal process circuit 3 so that the three primary colors of red, green and blue are obtained in the second signal output 5. The video signal the same as that given to the first television signal input terminal 1 is used when other information (for example, in the case of teletext) is superposed on one television signal. In this case, the signal process circuit 3 retrieves the character or pattern signal and decodes it to thereby obtain the three primary colors of red, green and blue in the second signal output 5.

On the other hand, the television signal output 8 outputs a first or second television signal, by which a control signal is generated at the control signal generator means 7. The control signal generated therein is obtained as an output signal at the control signal output 9 and switch signal output 10. According to the switch signal outputted from the switch signal output 10, the first and second television signals are switched by the switching circuits 6 and outputted to the output terminals 11.

The circuit of conventional example in FIG. 1, however, has been defective in that the picture becomes very indistinct when the first signal output 4 is about equal in the brightness level or in the chroma level to the second signal output 5.

SUMMARY OF THE INVENTION

An object of the invention is to provide a multiple display control apparatus for a television receiver, which eliminates the aforesaid conventional defect and can display a plurality of signals distinctly in the same display tube.

Another object of the invention is to provide a multiple display control apparatus for a television receiver, comprising the circuitry suitable for the integrated circuit to thereby lower the manufacturing cost.

Still another object of the invention is to provide a multiple display control apparatus for a television receiver, which keep its hue constant by a gain control circuit.

A further object of the invention is to provide a multiple display control apparatus for a television receiver, having the same effect even in the color difference and luminance signals, or three primary colors of red, green and blue.

A still further object of the invention is to provide a multiple display control apparatus for a television receiver, which collects control signals into one kind to reduce the number of signal lines to thereby expect a lower manufacturing cost when formed in the integrated circuit.

In order to achieve the above objects the multiple display control apparatus of the invention is provided with: a signal process circuit having a first television signal input terminal and a second television signal input terminal; a control signal generator means connected to the signal process circuit; gain control circuits and switching circuits, the gain control circuits connecting with first signal outputs of the signal process circuit and second and third control signal outputs of the control signal generator means respectively; the switching circuits connecting with the gain control circuits, second signal outputs of the signal process circuit, and a switch signal output of the control signal generator unit; and the signal process circuit connecting with a first control signal output, so that the gain control characteristic of each gain control circuit depends on output impedance of the signal process circuit and resistances and the control starting voltage of each gain control circuit is made equal to or higher than the pedestal level of television signal.

These and other objects, features and advantages of the invention will become more apparent upon a reading of the following detailed description with the accompanying drawings.

DETAILED DESCRIPTION OF THE PREFERRED EMBODIMENTS

Figure 2:
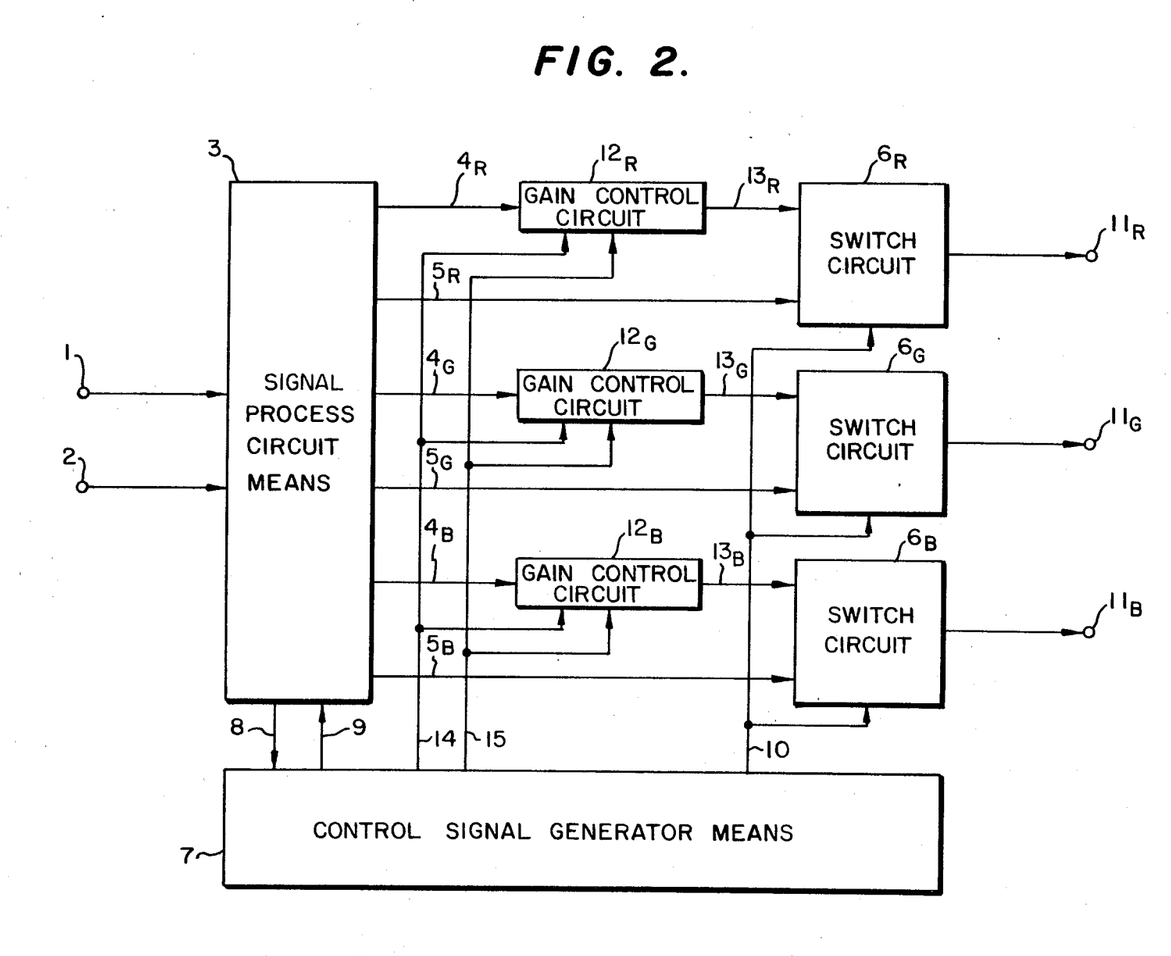
FIG. 2 is a block diagram of an embodiment of a multiple display control apparatus for a television receiver of the invention.

Referring to FIG. 2, the signals and components identical with those in FIG. 1 are designated by the same reference numerals, and the output signal of video-chroma circuit uses four systems for the color difference signal and luminance signal and three systems for three primary colors of red, green and blue as the same as in FIG. 1. In FIG. 2, reference numeral 12 designates gain control circuits, 13 designates signal outputs from gain control circuits 12, 14 designates a second control signal output, and 15 designates a third control signal outout. A first signal output 4 is subjected to a change of gain according to the third control signal output 15 at each gain control circuit 12 to thereby obtain a television signal having a low level as the signal output 13. The signal obtained at the signal output 13 and other input signals given from the second signal outputs 5, are switched according to the switch signal output 10 in the switching circuits 6, thereby obtaining an output signal at each output terminal 11.

Thus, in a case of switching and displaying the two signals as the above, since the television signal around each second signal output is lowered of its level, the construction in FIG. 2 has the effect of making distinct the second signal output.

Figure 3:
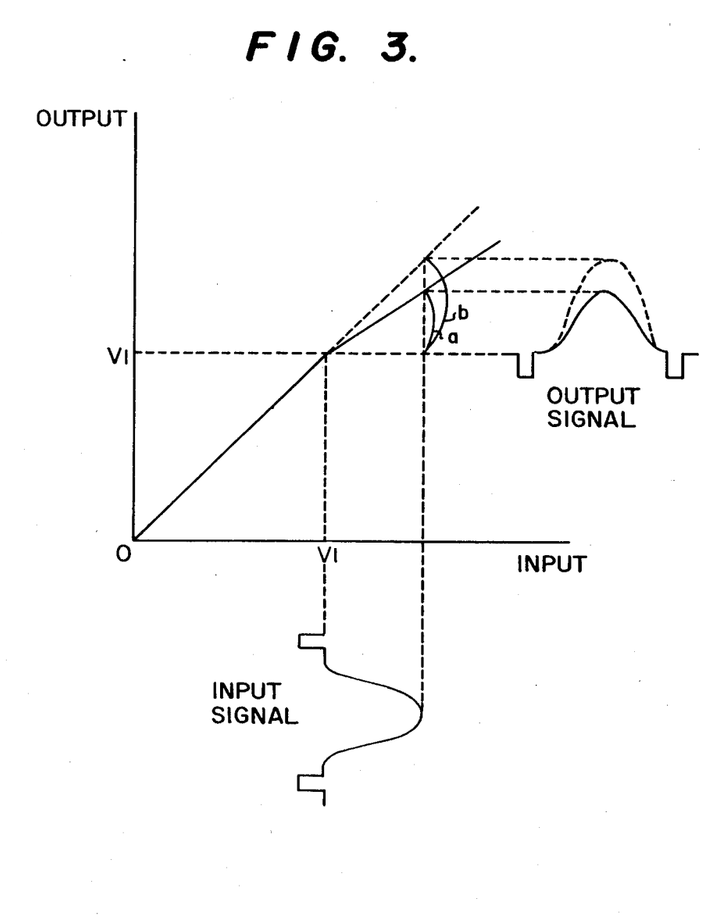
FIG. 3 is a graph of the input-output characteristic of a gain control circuit in the FIG. 2 embodiment.

FIG. 3 shows an example of characteristic of gain control circuit 12 in FIG. 2, in which $V_1$ is set to voltage equal to or higher than the pedestal level, and a/b is so selected that the first R-, G- and B- signals are lower in the level than the R-, G- and B- signals obtained at the second signal output 5. Thus, the output terminal 11 has the effect of suppressing a high level portion, in other words, signal component for allowing a CRT to emit the light, the apparatus is advantageous in that the second signal output is distinct. Also, since the first signal output has a tone, a natural picture can be obtained.

Figure 4:
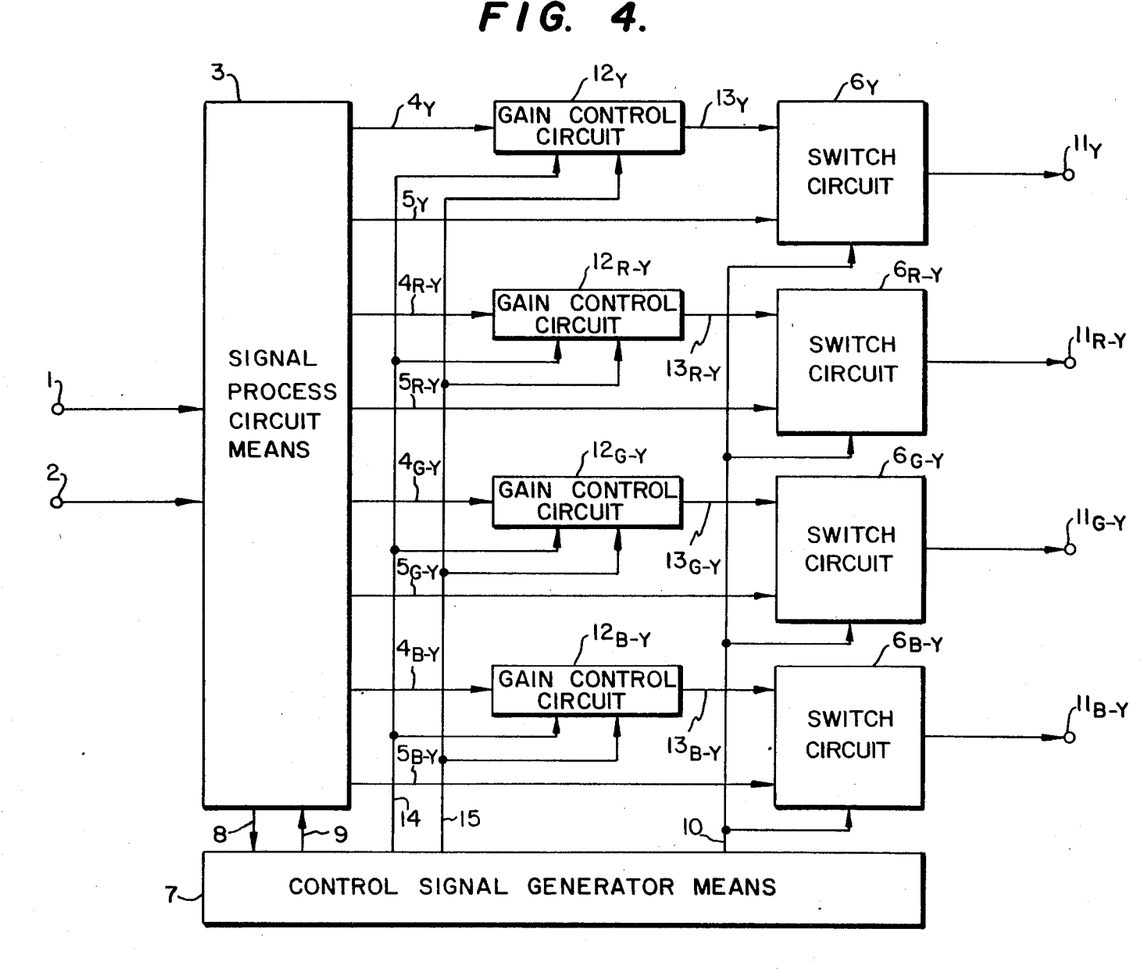
FIG. 4 is a block diagram of a modified embodiment of the multiple display control apparatus of the invention.

Referring to FIG. 4, a block diagram of a modified embodiment of the invention, in which the output signal of the signal process circuit comprises the luminance signal and color difference signal. In the same drawing, reference numerals 1 to 15 designate the same components as in FIG. 2 and reference numerals designating the systems of Y, R-Y, G-Y and B-Y are added with suffixes Y, R-Y, G-Y and B-Y respectively. In a case where the luminance signal is of negative polarity (the synchronous signal is upward), a gain control circuit 12Y is used which has the characteristic in FIG. 5 with respect to the luminance signal, in which $V_2$ is set to voltage of the level equal to or lower than the pedestal level, a/b being so selected that the brightness signal level of first television signal obtained as the output signal of gain control circuit 12Y becomes higher than that obtained at the second signal output 5Y. Gain control circuits 12R-Y, 12G-Y, and 12B-Y having the characteristic shown in FIG. 3 are used for the color difference signal. In this case, as the same as in the use of three primary colors of red, green and blue, $V_1$ is set to voltage of the level equal to or higher than the pedestal level. $V_1$ and a/b are selected so that the level of color difference signal obtained as the output signal of the respective gain control circuits 12R-Y, 12G-Y and 12B-Y becomes lower than that of same obtained by the respective second signal outputs 5R-Y, 5G-Y and 5B-Y, which is effective in suppressing a high level portion, i.e., the signal component for allowing the CRT to emit the light so that the second signal output is distinct. Also, the first signal output has a tone so as to maintain the picture natural.

Figure 6:
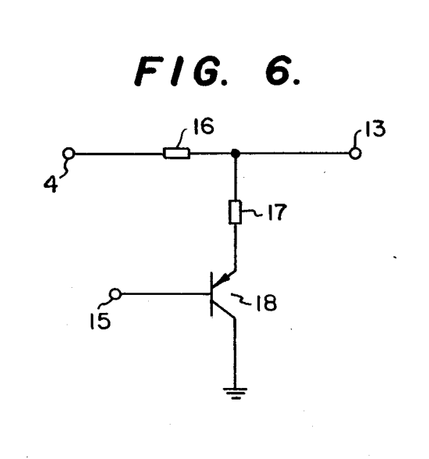
FIG. 6 is a circuit diagram explanatory of the gain control circuit in part in the FIG. 2 embodiment.

Next, an example of gain control circuit 12 having the input-output characteristic shown in FIG. 3 is shown concretely in part in FIG. 6, in which reference numerals 4, 13 and 15 designate the same components as in FIG. 2, 16 and 17 designate resistances, and 18 designates a PNP transistor. Also, the sum of resistance value of resistance 16 and output impedance of signal process circuit 2, is represented by $R_2$, and the control signal level given to the third control signal output 15 is represented by Vcc when not controlled and by $V_3$ when controlled. In the former case, the transistor 18 is in the state of cutoff so that the television signal given to the input terminal 4 is transmitted directly to the output terminal 13. In the latter case, when $V_{BE}$ of transistor 18 is neglected, the transistor 18 is cutoff when the television signal given to the input terminal 4 has a level of $V_3$ or below, but when the level of television signal becomes higher than $V_3$, a current flows between the emitter and the collector of transistor 18, so that the signal suppressed of the level is obtained at the output terminal 13. In other words, the input-output characteristic of the circuit in FIG. 6 becomes as shown in FIG. 3 and has the relations of $a/b = R_2/(R_1 + R_2)$ and $V_1 = V_3$.

Figure 5:
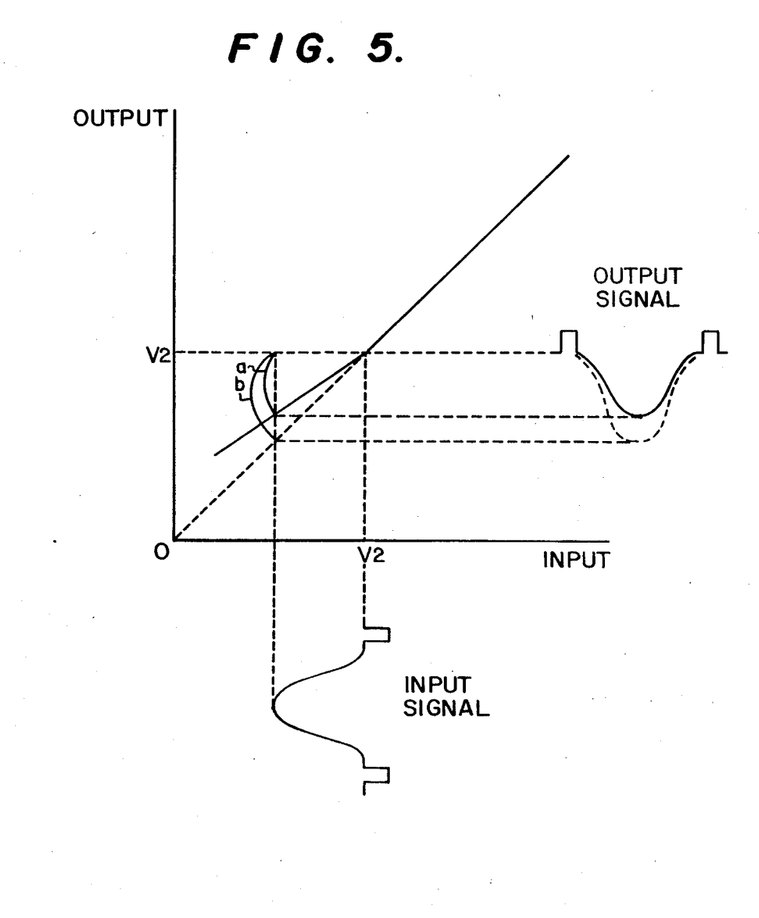
FIG. 5 is a graph of the input-output characteristic of a gain control circuit in the FIG. 4 embodiment.
Figure 7:
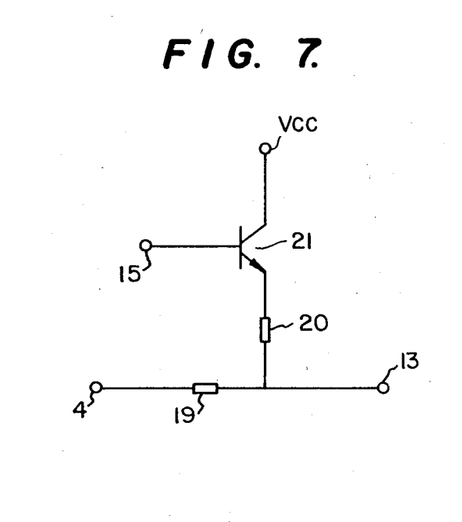
FIG. 7 is a circuit diagram exemplary of the gain control circuit in part in FIG. 4 embodiment.

An example of gain control circuit 12Y having the input-output characteristic shown in FIG. 5 is shown concretely in part in FIG. 7, in which reference numerals 4, 13 and 15 designate the same components as in FIG. 2, 19 and 20 designate resistances, and 21 designates a NPN transistor. Now, the sum of resistance value of resistance 19 and output impedance of signal process circuit 2, is represented by $R_1$, the resistance value of resistance 20 by $R_2$, and the control signal level given to the third signal output 15 is given by 0 when not controlled and by $V_4$ when controlled. When $V_{BE}$ is neglected, the transistor 21 is in the state of cutoff when not controlled and when controlled and the level of television signal given to the input terminal 4 is higher than $V_4$, the television signal being transmitted directly to the outout terminal 13. On the other hand, when controlled and the level of the same is $V_4$ or below, a current flows between the collector and the emitter of transistor 21, so that DC potential at the output terminal 13 rises. Hence, the input-output characteristic of the circuit in FIG. 7 is as shown in FIG. 5 and has the relations of $a/b = R_2/(R_1 + R_2)$ and $V_2 = V_4$.

In the circuit in FIG. 6, the control signal level Vcc when not controlled may be enough to put the transistor 18 in cutoff and need only be higher than the level of television signal given to the input terminal 4. Similarly, in the circuit in FIG. 7, the control signal level when not controlled, need only put the transistor 21 in the state of cutoff.

In addition, values of $V_1$ and $V_2$ in FIGS. 6 and 7 depend upon the second control signal outputs 14 in FIGS. 2 and 3, the value of $V_1$ being made equal to or higher than the pedestal level and that of $V_2$ equal to or lower than the same.

Next, explanation will be given on a modified embodiment of the multiple display control apparatus of the invention in FIG. 8, which concerns the three primary colors of red, green and blue, but omits the color difference signal and brightness signal because of the same steps as the abovementioned.

Figure 8:
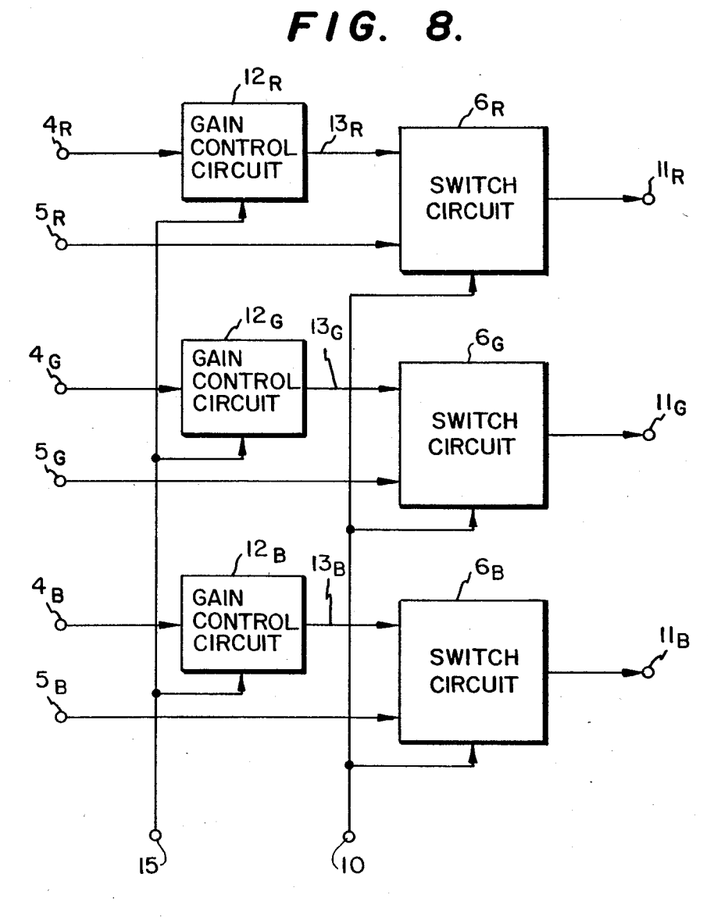
FIGS. 8 through 15 are block diagrams of other modified embodiments of the multiple display control apparatus of the invention.

In FIG. 8, the components and signals identical with those in FIG. 2 are designated by the same reference numerals. The television signal given as the first signal output 4 is suppressed of its level in each gain control circuit 12 and the output therefrom is given to each switching circuit 6 so that the first and second signals are switched therein and the output signal is outputted from each output terminal 11. Accordingly, this apparatus is effective in suppressing a high level portion of first signal, in other words, the signal component for allowing the CRT to emit the light so that the second signal output is distinct. Also, the first signal output has a tone so as to keep the picture natural. Furthermore, $V_1$ and $V_2$ in the input-output characteristic of gain control circuit 12 (FIGS. 3 and 5) are made equal to the pedestal level, whereby the apparatus is characterized in that the hue is not changed on the CRT.

Figure 9:
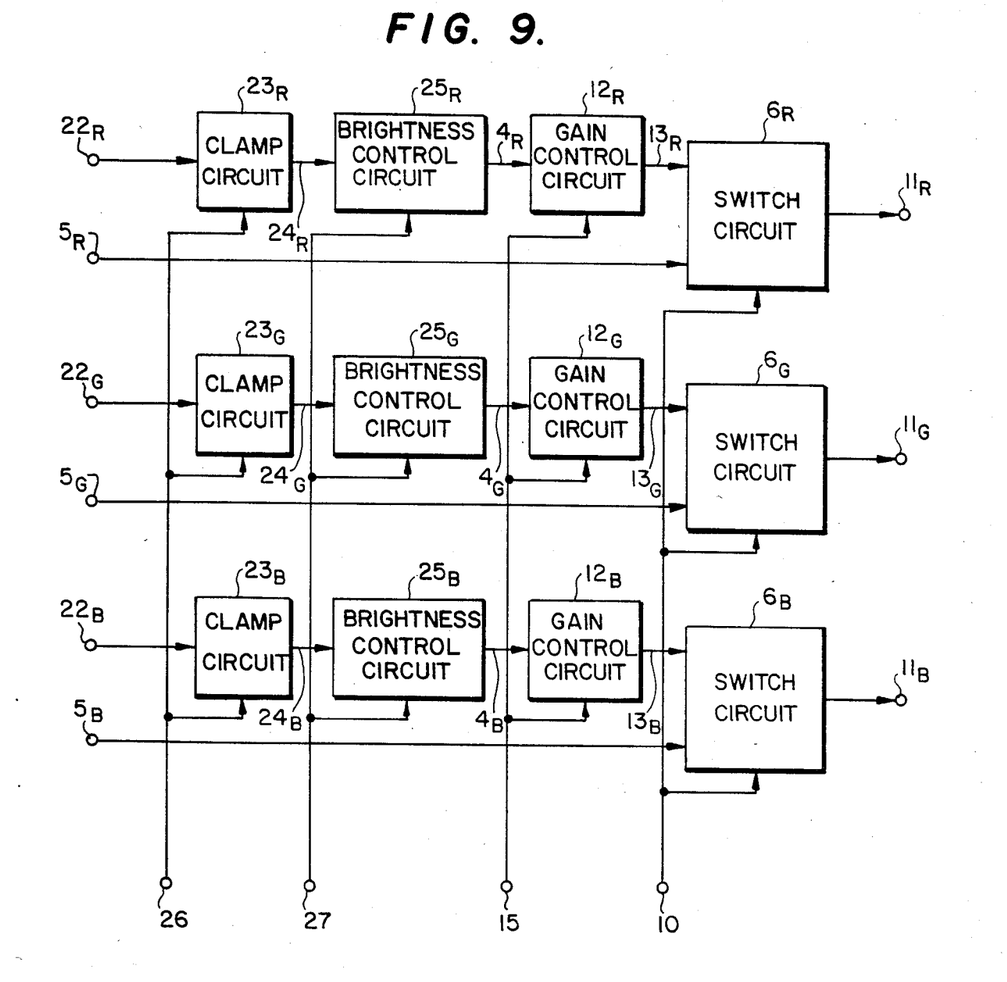

Another modified embodimentof a multiple display control apparatus of the invention is shown in FIG. 9, in which the components and signals identical with those in FIG. 2 are designated by the same reference numerals as in FIG. 2. In FIG. 9, reference numeral 22 designates third television signal input terminals, 23 designates first clamp circuits, 24 designates signal outputs of the first clamp circuit, 25 designates first brightness control circuits, 26 designates a clamp pulse input terminal, and 27 designates a brightness control signal input terminal.

The television signal given through the third television signal input terminals 22 is clamped by the clamp circuits 23, subjected to brightness control in the first brightness control circuits 25, and thereafter suppressed of the level to be given to the switching circuits 6. Hence, the apparatus is effective in suppressing a high level portion of the first signal, in other words, the signal component for allowing the CRT to emit the light, so that the second signal output is distinct. Also, the first signal output has a tone so as to keep the naturality of the picture. Furthermore, $V_1$ and $V_2$ in the input-output characteristics of gain control circuits 12 (in FIGS. 3 and 5), when made equal to the pedestal level, allow the apparatus to be characterized in that the hue is not changed on the CRT.

Figure 10:
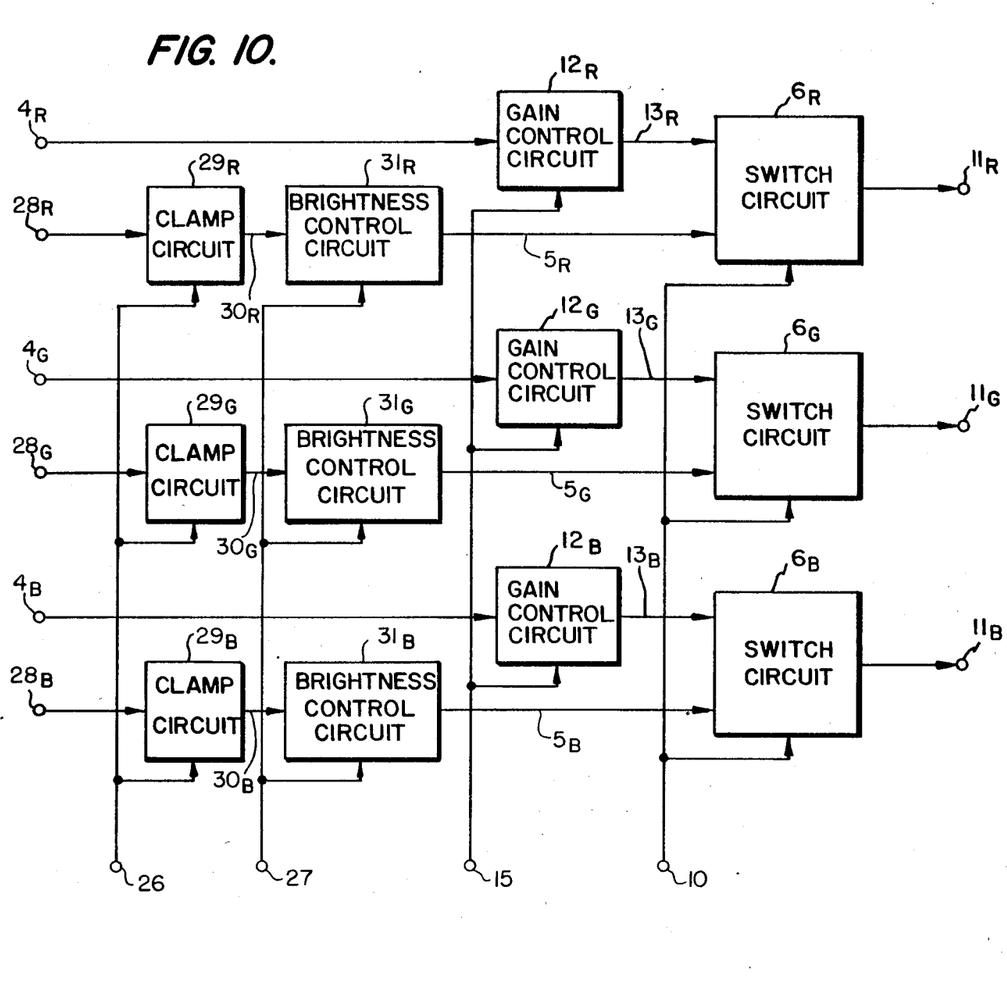

Next, still another modified embodiment of the multiple display control apparatus of the invention is shown in FIG. 10, in which the components and signals identical with those in FIG. 2 are designated by the same reference numerals as in FIG. 2. Reference numerals 26 and 27 designate the same components as in FIG. 9, 28 designates fourth television signal input terminals, 29 designates second clamp circuits, 30 designates signal outputs of second clamp circuits 29, and 31 designates second brightness control circuits.

The television signal given as the first signal output 4 is suppressed of its level at the gain control circuits 12 and the output signals therefrom are given to the switching circuits 6. The television signal given through fourth television signal input terminals 28 is clamped by the second clamp circuits 29, subjected to brightness control by the second brightness control circuits 31, and thereafter given to the switching circuits 6, the first and second signal outputs being switched therein and output to the output terminals 11. Accordingly, the apparatus is effective in suppressing a high level portion of first signal, in other words, the signal component for allowing the CRT to emit the light so that the second signal output is distinct. Also, the first signal output has a tone so as to keep the naturality of the picture. Furthermore, $V_1$ and $V_2$ in the input-output characteristics of gain control circuits 12 (in FIGS. 3 and 5), when made equal to the pedestal level, allow the apparatus to be characterized in that the hue is not changed on the CRT.

Figure 11:
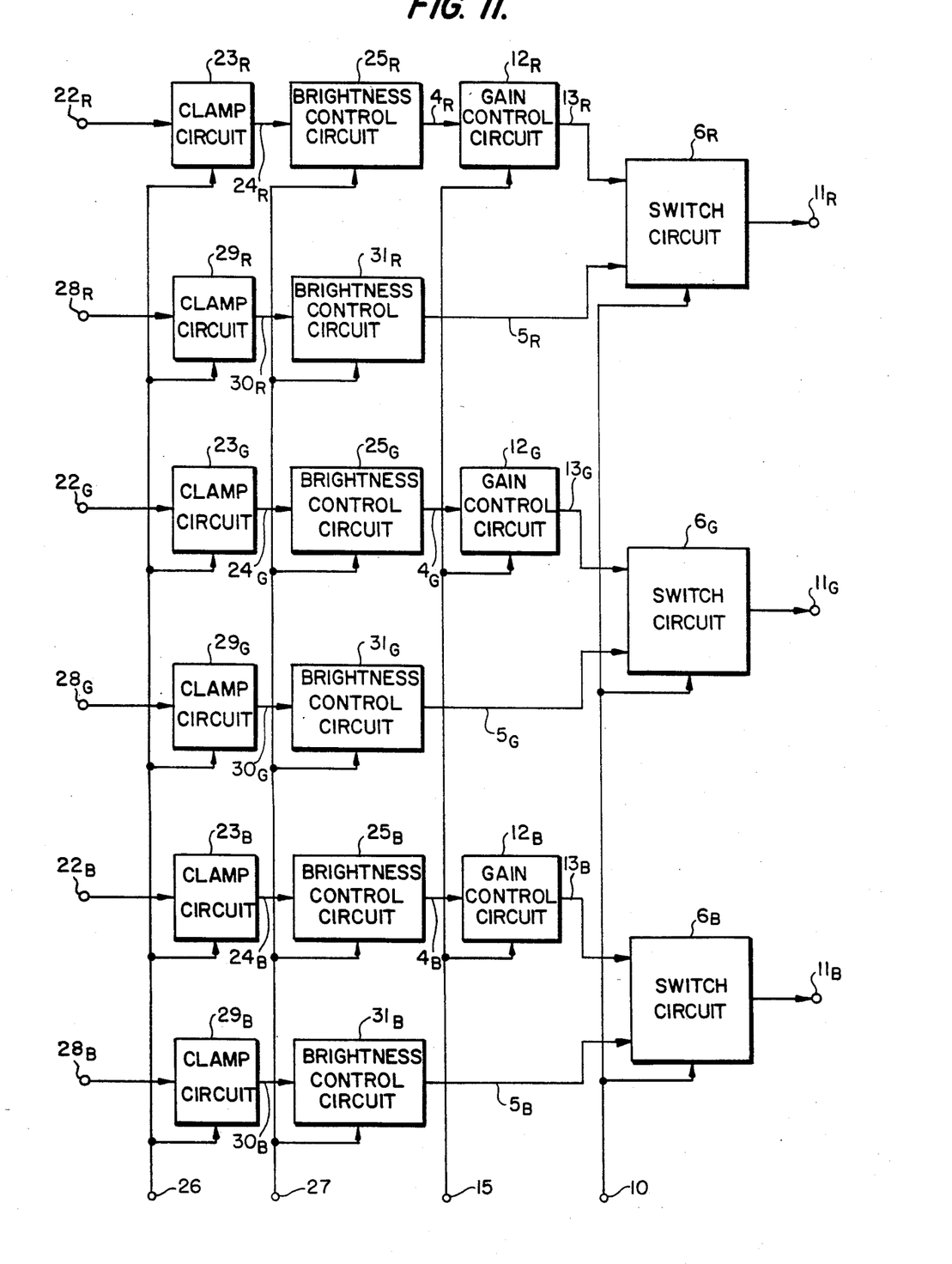

A further modified embodiment of the multiple display control apparatus of the invention will be shown in FIG. 11, in which the components and signals identical with those in FIGS. 2, 9 and 10 are disgnated by the same reference numerals as in these figures.

In FIG. 11, the first television signal given through the first signal input terminals 22 is clamped by the first clamp circuit 23, subjected to brightness control in the first brightness control circuits 25, and thereafter suppressed of the level at the gain control circuits 12, the output signals therefrom being given to the switching circuits 6 respectively. The second television signal given through the second signal input terminals 28 are clamped at the second clamp circuits 29, subjected to brightness control at the second brightness control circuits 31, and thereafter given to the switching circuit 6. The first and second signals are switched by the switching circuits 6 to be outputted to the output terminals 11. Hence, the apparatus is effective in suppressing a high level portion of the first signal, in other words, the signal component to allow the CRT to emit the light so that the second signal is distinct. Also, due to the tone existing in the first signal output, the naturality of the picture is maintained. Furthermore, $V_1$ and $V_2$ in the input-output characteristics of gain control circuits 12 (in FIGS. 3 and 5), when made equal to the pedestal level, allow the apparatus to have characteristic of the constant hue on the CRT.

Figure 12:
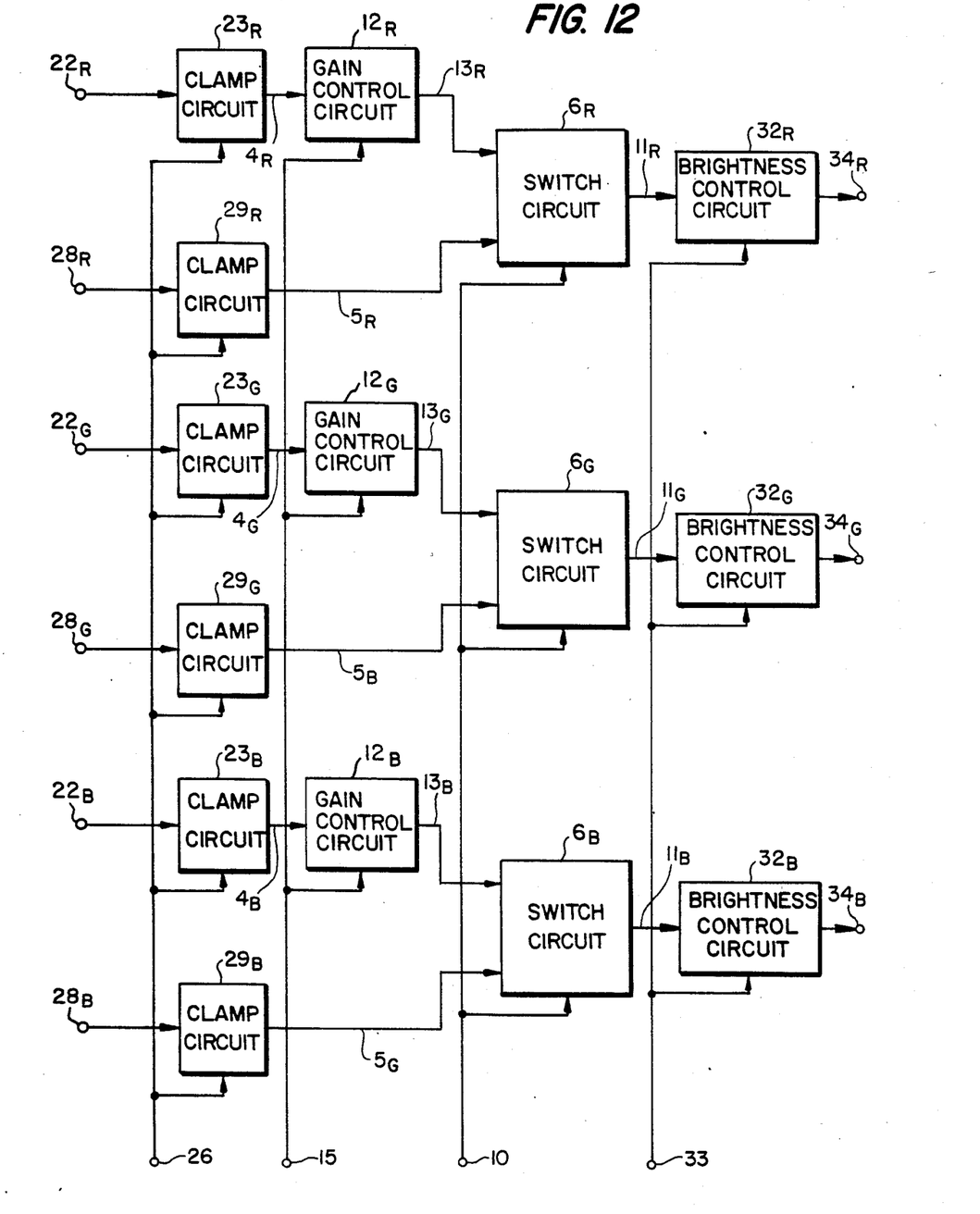

A still further modified embodiment of the multiple display control apparatus of the invention will be shown in FIG. 12, in which the components and signals identical with those in FIGS. 2, 9 and 10 are designated by the same reference numerals in these figures. In FIG. 12, reference numeral 32 designates third brightness control circuits, 33 designates a brightness control terminal, and 34 designates output terminals.

The television signal given through first signal input terminals 22 are clamped by first clamp circuits 23, subjected to brightness control at the gain control circuits 12, and the output signals therefrom are given to switching circuits 6 respectively. The television signal given through second signal input terminals 28 are clamped by second clamp circuits 29 and then given to the switcing circuits 6, the first and second signals being switched therewith so that the output signals are given to the third brightness control circuits 32, subjected to the brightness control at the third brightness control circuits 32, and given to the output terminals 34. Hence, the effect is obtained which suppresses a high level portion of the first signal, in other words, the signal component for allowing the CRT to emit the light, and which makes the second signal output distinct. Also, the first signal output has a tone so as to keep the naturality of the picture. Furthermore, the apparatus is effective in that since the first clamp circuits 23 fix the pedestal level, $V_1$ and $V_2$ in the input-output characteristics of gain control circuits 12 in FIGS. 3 and 5 can be always coincident with the pedestal level to thereby keep constant the hue on the CRT.

Figure 13:
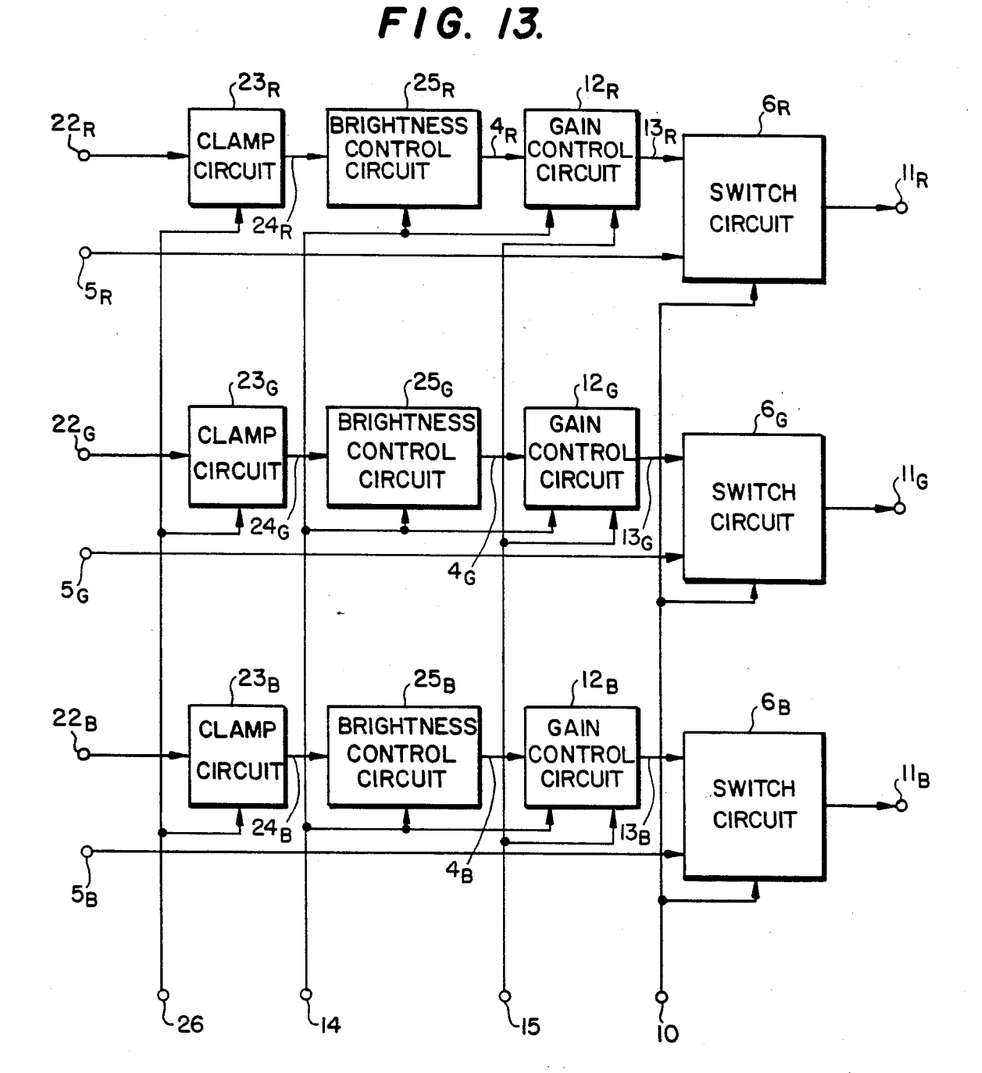

Yet another modified embodiment of the multiple display control apparatus of the invention will be shown in FIG. 13, in which the components and signals identical with those in FIGS. 2 and 9 are designated by the same reference numerals as in these figures. In FIG. 13, the first television signal given through first signal input terminals 22 is clamped at first clamp circuits 23, subjected to brightness control at first brightness control circuits 25, and thereafter suppressed of the level at gain control circuit 12, the output signals therefrom being given to switching circuits 6 so that the first and second signals are switched thereat and outputted to output terminals 11 respectively. Hence, the effect of suppressing a high level portion of first signal, in other words, the signal component to allow the CRT to emit the light, is obtained so that the apparatus is effective in that the second signal output becomes distinct. Also, since the first signal output has a tone, the naturality of the picture can be maintained.

Also, since the second control signal output 14 is connected to both the first brightness control circuits 25 and gain control circuits 12, $V_1$ and $V_2$ in the input-output characteristics of gain control circuits 12 (in FIGS. 3 and 5) change as the brightness is changed. In other words, since the first signal pedestal level and $V_1$ and $V_2$ are controlled to be always equal to each other, the apparatus is effective in that the hue on the CRT is constant.

Figure 14:
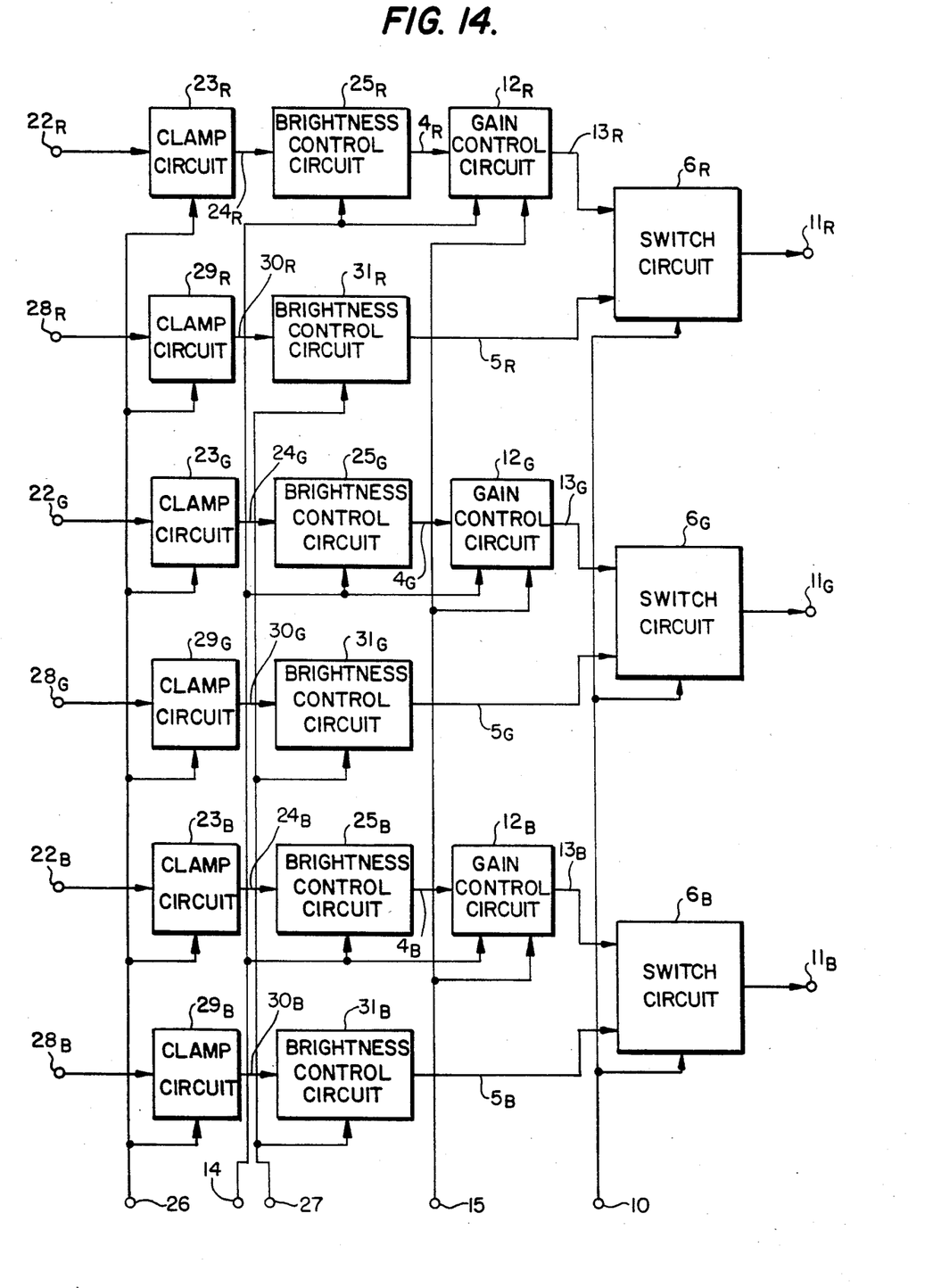

A yet further modified embodiment of the multiple display control apparatus of the invention will be shown in FIG. 14, in which the components and signals identical with those in FIGS. 2, 9 and 10 are designated by the same reference numerals in these figures.

In FIG. 14, the first television signal given through first signal input terminals 22 is clamped by first clamp circuits 23, subjected to brightness control at first brightness control circuits 25, and thereafter suppressed of the level at gain control circuits 12, the output signals therefrom being given to switching circuits 6. The second television signal given through second input terminals 28 are clamped by the second clamp circuits 29, subjected to brightness control at second brightness control circuits 31, and thereafter given to switching circuits 6, so that the first and second television signals are switched at the switching circuits 6 and output to output terminals 11. Hence, a high level portion of first signal, that is, the signal component to allow the CRT to emit the light, is effectively suppressed, whereby the apparatus has the effect in that the second signal is distinct. Also, the first signal having a tone keep the picture natural.

Also, the second control signal output 14 connects with both the first brightness control circuits 25 and gain control circuits 12, whereby $V_1$ and $V_2$ in the input-output characteristics of gain control circuits 12 (in FIGS. 3 and 5) change following the brightness when changed. In other words, since the pedestal level of first signal and $V_1$ and $V_2$ are controlled to be always equal to each other, the apparatus has the effect in that the hue is constant on the CRT.

Figure 15:
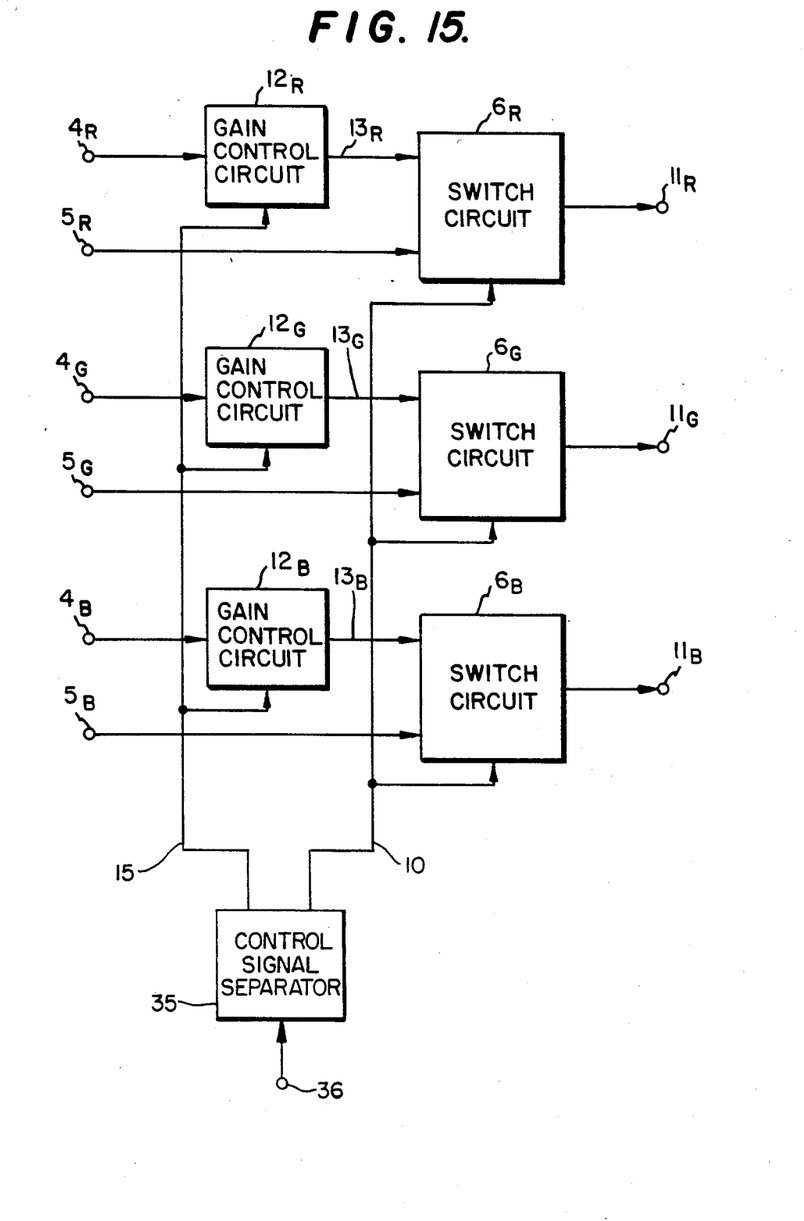

Still a further modified embodiment of the multiple display control apparatus of the invention will be shown in FIG. 15, in which the components and signals identical with those in FIG. 2 are designated by the same reference numerals as in FIG. 2. In FIG. 15, the control signal given through a control signal input terminal 36 is separated by a control signal separator 35 so that one output therefrom is given to gain control circuits 12 and the other to switching circuits 6. As a result, the first television signal of the suppressed level is obtained as the output signal at the output terminals 11, thereby making the second television signal distinct, which is the same as in FIG. 2.

Figure 16:
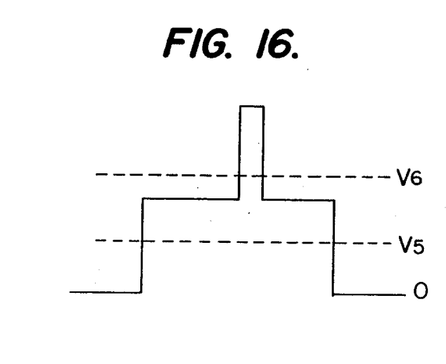
FIG. 16 is a waveform chart exemplary of a control signal of the invention.

Next, a concrete example of control signal given to the control signal input terminal 36 in FIG. 15 is shown in FIG. 16, which shows that when the control signal level is kept between 0 and $V_5$, the first television signal is transferred directly to be outputted to the output terminals 11, when between $V_5$ and $V_6$, the same is lowered of its level and outputted the output terminals 11, and when lower than $V_6$, the second television signal is outputted to the output terminals 11. In a case of the control signal level equal to or higher than $V_2$, since the second television signal is outputted to the output terminals 11, any gain control for the first television signal is acceptable.

Figure 17:
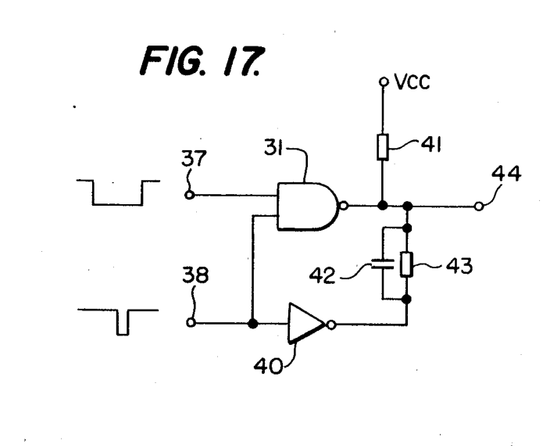
FIG. 17 is a circuit diagram exemplary of a control signal generator unit of the invention.

A concrete example of a circuit for generating the control signal exemplary in FIG. 16 will be shown in FIG. 17, in which reference numerals 37 and 38 designate input terminals, 39 designates a NAND circuit of open collector output, 40 designates an inverter circuit of open collector output, 41 designates a resistance, 42 designates a capacitor, 43 designates a resistance, and 44 designates an output terminal. FIG. 17 shows that the input terminal 37 is given again control signal, so that when the given gain control signal has a high level, the first television signal is transferred directly and when it has a low level, the same lowers its level. Also, the input-terminal 38 is given a switch signal, so that when the given switch signal has a high level, the first television signal is switched to be outputted, and when it has a low level, the second television signal is switched to be outputted. The capacitor 42 is used for improving the pulse waveform obtained from the output terminal 44.

Figure 18:
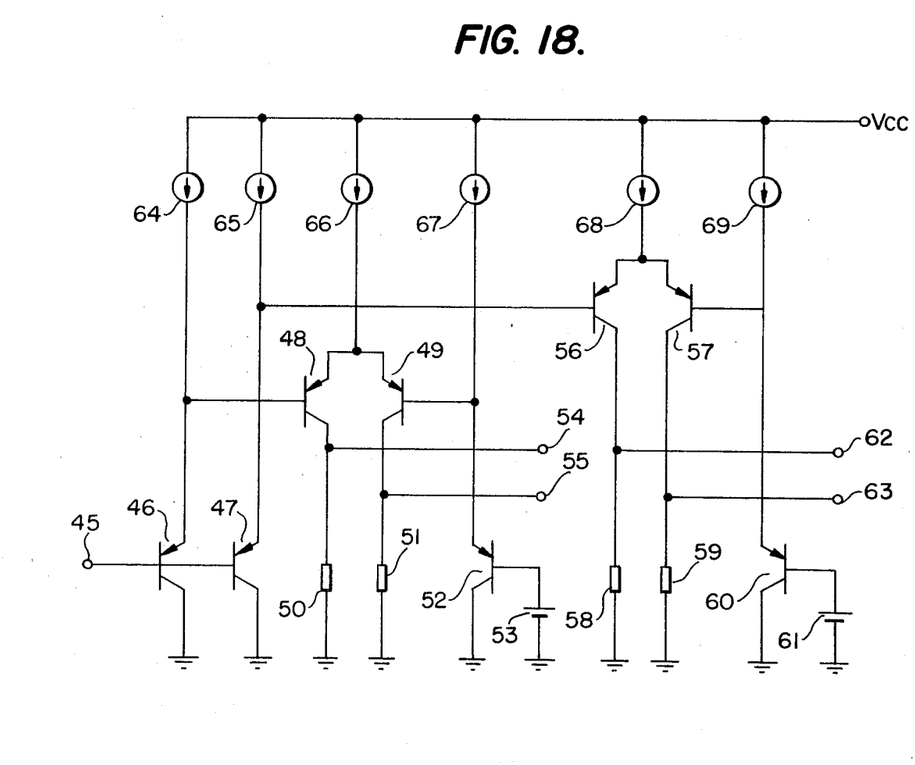
FIG. 18 is a circuit diagram exemplary of a control signal separator of the invention.

Next, a concrete example of control signal separator 35 in FIG. 15 will be shown in FIG. 18, in which reference numeral 45 designates a control signal input terminal, 46, 47, 48 and 49 designate PNP transistors respectively, 50 and 51 designate resistances, 52 designates a PNP transistor, 53 designates a DC voltage source, 54 and 55 designate output terminals, 56 and 57 designate PNP transistors, 58 and 59 designate resistances 60 designates a PNP transistor, 61 designates a DC voltage source, 62 and 63 designate output terminals, and 64, 65, 67, 68 and 69 designate current source respectively. The control signal given through the control signal input terminal 45 is divided into two, one passing through an emitter follower of the transistor 46 and its voltage is compared by a differential amplifies of transistors 48 and 49 so that the output signal is obtained at the output terminals 54 and 55, and the other passing through an emitter follower of transistor 47 and its voltage is compared by a differential amplifier of transistors 56 and 57 so that the output signal is obtained at the input terminals 62 and 63. Now, when voltage values of DC voltage sources 53 and 61 are represented by $V_5$ and $V_6$ respectively, the gain control signals are obtained at the output terminals 54 and 55 and the switch signals at those 62 and 63.

The circuit in FIG. 18 is used to allow the gain control signal superposed on the switch signal to be given to one input terminal, which is effective especially in the integrated circuit, whereby the apparatus is advantageous in that the number of pins is reduced to result in a low manufacturing cost.

Although several embodiments have been described, they are merely exemplary of the invention and not to be constructed as limiting, the invention being defined solely by the appended claims.

What is claimed is:

1. A multiple display control apparatus for a television receiver, comprising:
   a signal process circuit having a first television signal input terminal and a second television signal input terminal;
   a control signal generator means connected to said signal process circuit; and
   a gain control circuit and a switching circuit, said gain control circuit being connected with a first signal output of said signal process circuit and second and third control signal outputs of said control signal generator means, said switching circuits being connected with said gain control circuit, a second signal output of said signal process circuit, and a switch signal output of said control signal generator means, and said signal process circuit being connected with a first control signal output of said control signal generator means, so that the gain control characteristics of said control circuit depends on an output impedance of said signal process circuit and resistances, and control starting voltage of said gain control circuit is made equal to or higher than the pedestal level of the television signal, wherein said apparatus is arranged so that the level of said first signal output of said signal process circuit is lowered in response to said second and third control signal output of said control signal generator means.

2. A multiple display control apparatus according to claim 1, further comprising a control signal separator having a control signal input terminal, wherein a first output of said control signal separator is the third control signal output and a second output of said control signal separator is the switch signal output.

3. A multiple display control apparatus for a television receiver, comprising:
   a signal process circuit having a first television signal input terminal and a second television signal input terminal;
   a control signal generator means connected to said signal process circuit; and
   a gain control circuit and a switching circuit, said gain control circuit being connected with a first signal output of said signal process circuit and second and third control signal outputs of said control signal generator means, said switching circuits being connected with said gain control circuit, a second signal output of said signal process circuit, and a switch signal output of said control signal generator means, and said signal process circuit being connected with a first control signal output of said control signal generator means, so that the gain control characteristics of said gain control circuit depends on an output impedance of said signal process circuit and resistances, and control starting voltage of said gain control circuit is made equal to or higher than the pedestal level of the television signal;
   further comprising: a clamp circuit having a third television signal input terminal and a clamp pulse input terminal in common; and a brightness control circuit connected with said clamp circuit and having a brightness control terminal in common, the output of said brightness control circuit being the first signal output.

4. A multiple display control apparatus for a television receiver, comprising:
   a signal process circuit having a first television signal input terminal and a second television signal input terminal;
   a control signal generator means connected to said signal process circuit; and
   a gain control circuit and a switching circuit, said gain control circuit being connected with a first signal output of said signal process circuit and second and third control signal outputs of said control signal generator means, said switching circuits being connected with said gain control circuit, a second signal output of said signal process circuit, and a switch signal output of said control signal generator means, and said signal process circuit being connected with a first control signal output of said control signal generator means, so that the gain control characteristics of said gain control circuit depends on an output impedance of said signal process circuit and resistances, and control starting voltage of said gain control circuit is made equal to or higher than the pedestal level of the television signal;
   further comprising: a clamp circuit having a fourth television signal input terminal and a clamp pulse input terminal in common; and a brightness control circuit connected to said clamp circuit and having a brightness control terminal in common, the output of said brightness control circuit being the second signal output.

5. A multiple display control apparatus for a television receiver, comprising:
   a signal process circuit having a first television signal input terminal and a second television signal input terminal;
   a control signal generator means connected to said signal process circuit; and
   a gain control circuit and a switching circuit, said gain control circuit being connected with a first signal output of said signal process circuit and second and third control signal outputs of said control signal generator means, said switching circuits being connected with said gain control circuit, a second signal output of said signal process circuit, and a switch signal output of said control signal generator means, and said signal process circuit being connected with a first control signal output of said control signal generator means, so that the gain control characteristic of said gain control circuit depends on an output impedance of said signal process circuit and resistances, and control starting voltage of said gain control circuit is made equal to or higher than the pedestal level of the television signal;
   further comprising: a first clamp circuit having a third television signal input terminal and a clamp pulse input terminal in common; a first brightness control circuit connected with said first clamp circuit and having a brightness control terminal in common; a second clamp circuit having a fourth television signal input terminal and connected with said clamp pulse input terminal; and a second brightness control circuit connected with said second clamp circuit and said brightness control terminal, the output of said first brightness control circuit being the first signal output, and the output of said second brightness control circuits being the second signal output.

6. A multiple display control apparatus for a television receiver, comprising:

a signal process circuit having a first television signal input terminal and a second television signal input terminal;

a control signal generator means connected to said signal process circuit; and a gain control circuit and a switching circuit, said gain control circuit being connected with a first signal output of said signal process circuit and second and third control signal outputs of said control signal generator means, said switching circuits being connected with said gain control circuit, a second signal output of said signal process circuit, and a switch signal output of said control signal generator means, and said signal process circuit being connected with a first control signal output of said control signal generator means, so that the gain control characteristics of said gain control circuit depends on an output impedance of said signal process circuit and resistances, and control starting voltage of said gain control circuit is made equal to or higher than the pedestal level of the television signal;

further comprising: a first clamp circuit having a third television signal input terminal and a clamp pulse input terminal in common; and a second clamp circuit having a fourth television signal input terminal and connected with a clamp pulse input terminal, wherein the output of said first clamp circuit is the first signal output and the output of said second clamp circuit is the second signal output, said apparatus having a brightness control circuit which is connected with said switching circuit and has a brightness control terminal in common.

7. A multiple display control apparatus for a television receiver, comprising:

a signal process circuit having a first television signal input terminal and a second television signal input terminal;

a control signal generator means connected to said signal process circuit; and a gain control circuit and a switching circuit, said gain control circuit being connected with a first signal output of said signal process circuit and second and third control signal outputs of said control signal generator means, said switching circuits being connected with said gain control circuit, a second signal output of said signal process circuit, and a switch signal output of said control signal generator means, and said signal process circuit being connected with a first control signal output of said control signal generator means, so that the gain control characteristic of said gain control circuit depends on an output impedance of said signal process circuit and resistances, and control starting voltage of said gain control circuit is made equal to or higher than the pedestal level of the television signal;

further comprising: a clamp circuit having a third television signal input terminal and a clamp pulse input terminal in common; and a brightness control circuits connected with said clamp circuit and said second control signal output, the output of said brightness control circuit being the first signal output.

8. A multiple display control apparatus for a television receiving, comprising:

a signal process circuit having a first television signal input terminal and a second television signal input terminal;

a control signal generator means connected to said signal process circuit; and a gain control circuit and a switching circuit, said gain control circuit being connected with a first signal output of said signal process circuit and second and third control signal outputs of said control signal generator means, said switching circuits being connected with said gain control circuit, a second signal output of said signal process circuit, and a switch signal output of said control signal generator means, and said signal process circuit being connected with a first control signal output of said control signal generator means, so that the gain control characteristics of said gain control circuit depends on an output impedance of said signal process circuit and resistances, and control starting voltage of said gain control circuit is made equal to or higher than the pedestal level of the television signal;

further comprising: a first clamp circuit having a third television signal input terminal and a clamp pulse input terminal in common; a first brightness control circuit connected with said first clamp circuit and said second control signal output; a second clamp circuit having a fourth television signal input terminal and connected to said clamp pulse input terminal; and a second brightness control circuit connected with said second clamp circuit and having a brightness control terminal in common, wherein the output of said first brightness control circuit is the first signal output and the output of said second brightness circuit is the second signal output.

* * * * *